United States Patent Office 2,780,799
Patented Feb. 5, 1957

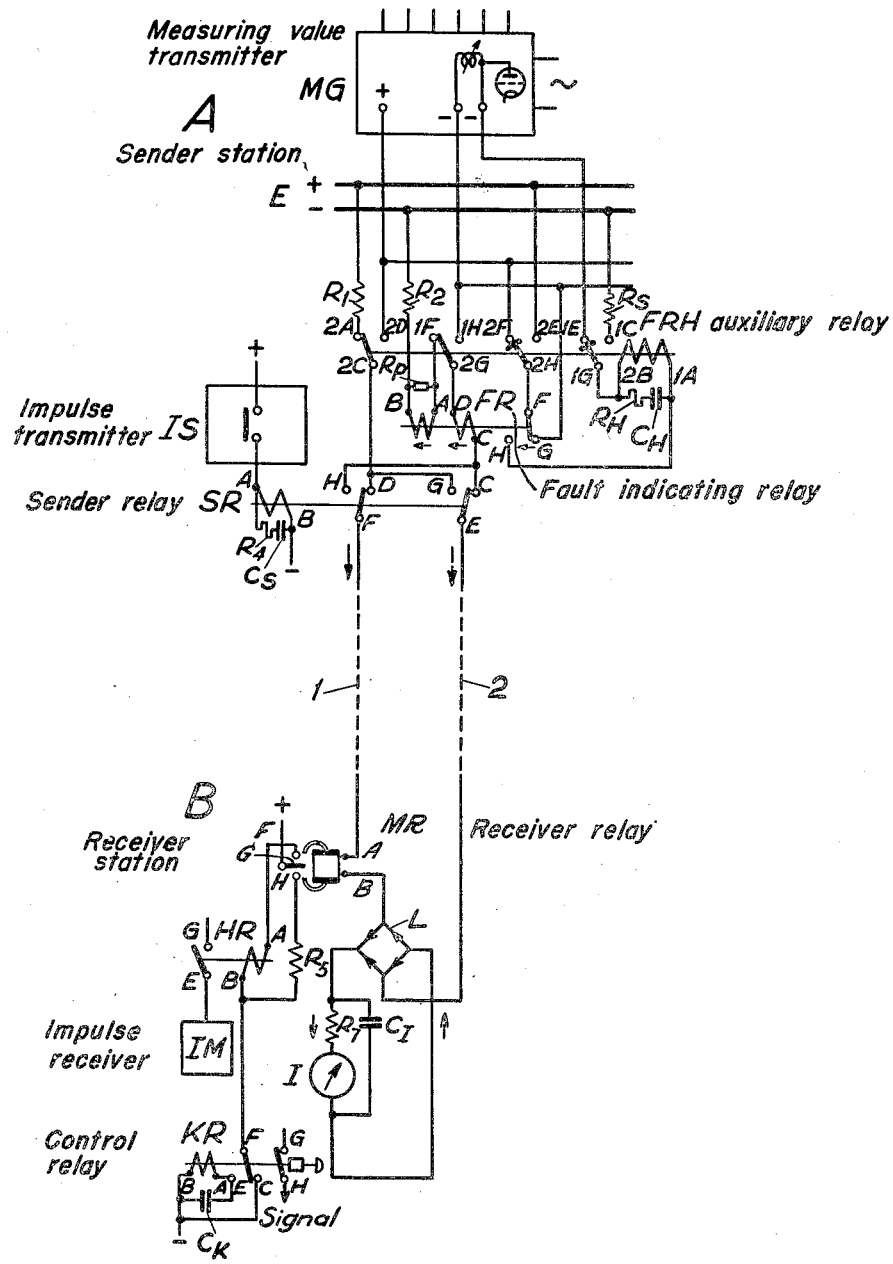

2,780,799

MEASUREMENT OF INTENSITY AND TRANSMISSION OF IMPULSES THROUGH THE SAME TRANSMISSION LINE

Hugo Hansson, Vasteras, Sweden, assignor to Allmanna Svenska Elektriska Aktiebolaget, Vasteras, Sweden, a corporation of Sweden Application October 29, 1953, Serial No. 389,123

Claims priority, application Sweden November 6, 1952

6 Claims. (Cl. 340—180)

When measuring by means of an intensity transmitter in which the measuring value is transformed in direct current proportional to the measuring value, there is the possibility of transmitting also an impulse frequency by reversing the direction of the current in the transmission line.

Especially suitable is said simultaneous transmission through the same transmission line of a power measuring value which is to be measured instantaneously and integrated to energy or average power by means of a slow impulse frequency (power impulses) from an impulse sender driven by a separate meter in the sender station.

It is, however, also possible to transmit a quick impulse frequency by reversing the direction of the measuring current, i. e. another instantaneous measuring value by employing the impulse frequency method.

According to the present invention a method for the simultaneous transmission of intensity measuring values and impulses from a sender station to a receiver station through the same transmission lines by means of a direct current proportional to said measuring values, is characterised in that said current is transmitted in such a manner that its direction is reversed for the duration of each impulse, while it regains its original direction in the receiver. This mutual reversing of the direction of the measuring current is obtained according to the invention by means of a relay arrangement for the reversing of the direction on the sender side and by a rectifier arrangement on the receiver side, which passes the current continuously to a measuring instrument in one direction only, with the result that on the one hand the intensity measurement is continuous even though the same line is also used for the transmission of impulses to an impulse integrating instrument, for instance. On the other hand the arrangement according to the invention allows the impulse transmission to continue even though the intensity measurement should be disturbed for some reason. Furthermore facilities are provided for indicating faults both on the intensity measuring transmitter and in the transmission line.

The invention will be described, reference being made to accompanying drawing.

It will be assumed that a power measuring value is to be transmitted from the sender station A to the receiver station B.

The current which is proportional to the instantaneous power is received by a measuring value transmitter MG which is a torque balance transmitter. The current has a fundamental value below which the current falls only on a fault in the torque balance transmitter. The fundamental value, as a rule, is 5 ma. and the maximum value at the highest measuring value 15 ma., i. e. a current range 5–15 ma. corresponds to the measuring value.

Mode of operation

In the drawing all relays are represented in the unenergised condition. If a voltage is present from a separate voltage source E, a current flows from positive E over a resistance R₁, the contact 2A—2C on the auxiliary relay FRH, the contact D—F on a sender relay SR, through the transmission wire 1 to the receiver station and there through the coil A—B in a receiver relay MR, through a rectifier L, a resistance R₇ and the measuring instrument I and then returns through the transmission wire 2 to the sender station and over the contact E—C of the sender relay SR, the coil C—D on a fault-indicating relay FR, the contact 2G—1F on the relay FRH, the coil A—B in the relay FR and the resistance R₂ to negative E. The current causes the operation of the relay FR in the sender station and of the relay MR in the receiver station in the direction of the arrows.

The contact F—H in the relay FR is closed and if the intensity measuring transmitter MG delivers current, the latter flows from the positive pole over the contact 2F—2H of the relay FRH, the contact F—H in FR, through the coil 1A—2B and over the contact 1G—1E of the relay FRH to the negative pole of the transmitter MG. The current from MG has to be sufficient for operating the relay FRH. In order to obtain in certain cases sufficiently high current for the operation of relay FRH, a compensation coil in the measuring value transmitter MG may be bridged, whereby the transmitter delivers its maximum current to the relay independent of the measuring value occurring for the instant. The relay FRH is operated, causing the changing-over of the position of all contacts in this relay. The contact 1G—1C is established before the contact 1G—1E is broken and the contact 2H—2E is established before the contact 2H—2F is broken. Consequently the holding of the relay FRH is transferred without interruption to the separate voltage source E and the relay is disconnected from the measuring value transmitter MG. By means of a resistance R_H the holding current for the relay FRH may be adapted to the voltage E independently of its magnitude, a condenser C_H being provided in series. The two other changing-over contacts of the relay FRH change over so that the transmission line 1, 2 is connected to the measuring value transmitter MG, and the auxiliary voltage E is disconnected from the measuring line. The relay FR is held in operated position by the measuring current by means of the holding coil C—D.

The normal condition for measuring thus is as follows: The relay FR and FRH are operated. Measuring current from transmitter MG flows from positive over the contacts 2D—2C of FRH and D—F of SR through the transmission wire 1, receiver relay MR, rectifier L and instrument I in the receiver station and returns through transmission wire 2, and in the sender station over the contact E—C of relay SR, holding coil C—D of relay FR and contact 2G—1H to negative in the measuring value transmitter. The measuring current flows in the direction of the arrow below the contact H—D—F when relay SR is in the position shown, i. e. if no impulse is being sent from the impulse sender IS.

The measuring current varies as mentioned above between 5 and 15 ma. within the existing measuring range of the measuring value transmitter (e. g. a range between 0–10 mw.). The relay MR and FR therefore have to work between these current values in order to be independent of the measuring value.

The instrument I which is traversed by the measuring current is a conventional moving coil instrument having a scale with suppressed zero so that the whole scale can be used between the measuring values 5 and 15 ma. The instrument, of course, is calibrated for the magnitude of the primary measuring values i. e. 0–10 mw. for instance.

Impulse transmission

If the impulse transmitter IS within the sender station makes contact, the relay SR is operated. Thereby the direction of the current in the transmission line is reversed by the change-over contacts SR as indicated by the dotted arrow below contact G—E—C. In the receiver station the current through the coil A—B of relay MR also changes its direction, so that this relay closes the contact F—G (against the direction of the arrow). Owing to the action of the rectifier L, however, the current through the instrument keeps its former direction. A condenser $C_1$ is interconnected for the purpose of maintaining the current during the short time necessary for the reversion of the current.

The contact F—G in the receiver relay MR closes the circuit for the relay HR and a contact in this relay influences a device IM (the impulse receiver) in the control station, which device is intended to be controlled by the impulse transmission (for instance an impulse counter for energy measurement).

When the contact in the impulse transmitter IS in the sender station opens again so that the sender relay SR is released, the direction of the currents through the transmission line and the receiver relay MR revert to its former directions, whereupon contact F—G is opened and contact F—H is closed. The relay HR therefore, will bring about impulses at the same rate as the impulse sender IS in the sender station.

The current through the coil C—D of relay FR in the sender station does not change its direction on the impulse transmission by the sender relay SR. By means of a parallel resistance $R_p$ across the coil A—B of the relay FR this relay is made slow to release and is therefore not released at the change-over actions of the sender relay SR.

A condenser $C_s$ in series with a resistance $R_4$ across the coil of the relay SR may be necessary in some cases in order to prolong the duration of the impulse transmission from the transmitter IS.

*Faults in the intensity measurement*

If faults occur on the measuring value transmitter MG so that the measuring current disappears, the fault relay FR is released and therefore also the auxiliary relay FRH. In this way the switching-over to the separate voltage source E in the sender station is effected. By means of the resistances $R_1$ and $R_2$ the current is suitably so adjusted that the same current is obtained in the transmission line as the fundamental current from the measuring value transmitter, i. e. for instance 5 ma. The result is, that the impulse giving and the impulse receiving continue to act even though the measuring value transmitter is disconnected. By choosing the transmission current equal to the fundamental current of the measuring value transmitter it becomes possible that in summing up a plurality of measuring value within the control station, one measuring value transmitter may be disconnected but the sum of the remaining measuring values will be correct, since the fundamental current from the disconnected transmitter is received from a separate voltage source. The instrument for the disconnected measuring value therefore will show zero.

In order to receive signals and indication in the receiver station on the occurance of faults of the intensity measurement, a control relay KR is inserted in the receiver station. This relay for instance may be of the type by which signals may be transmitted, the signal contact G—H and the auxiliary contact F—E of the relay being influenced by a resetting button. The contact F—E is connected as a hold-in contact in series with the coil A—B of relay KR. The relay KR receives current in both positions of MR, hence both upon impulse transmission (in series with the coil of HR), and where no impulse transmission takes place (in series with a substitution resistance $R_5$).

The relay KR is delayed in release by means of a condenser $C_K$ connected in parallel with the relay coil. The relay therefore is not released upon the normal switch-over operation of the contacts of the relay MR. Only if MR should not be traversed by current and if its contact therefore becomes placed in the middle position for a certain time, can the relay KR be released, whereupon the hold-in contact F—E is opened so that the relay cannot be re-operated. The signal contact G—H is closed simultaneously and gives a signal. Since the contact F—C also closes the circuit to the negative pole if the relay KR is released, the impulse measurement can continue without obstacle and the relay HR works even when KR is released.

In order to receive a signal of a fault in the measuring value transmitter MG, also the relay FRH in the sender station is provided with time-lag release by a parallel condenser $C_H$. If the current from the measuring value transmitter is open and the relay FR is released, the relay FRH remains operated for a certain time. This time lag of the release of relay FRH is chosen somewhat longer than the time lag of relay KR. This relay therefore has time to be released and to signal before relay FRH is released and the impulse measurement is switched-over to the separate voltage source E. Since the time lags for release may be chosen very short (e. g. 0.1 sec. for KR and 0.2 sec. for FRH) the impulse measurement will not be disturbed by interruption of the current. Since KR remains in released position the fault is observed by the personnel in the receiver station. If the fault is in the measuring value transmitter the signal relay KR may be reset immediately since the relay on resetting closes the hold-in contact F—E, whereby the coil of the relay is traversed by current.

*Faults in the transmission line*

Upon faults arising in the transmission line the mode of operation is the same as with faults in the measuring value mentioned above.

Since the contact in relay MR always lies in the middle position when faults arise in the transmission line, a resetting of the control relay KR is not possible, for the coil of KR cannot be traversed by current. The only thing to be done in this case is the resetting of the signal contact G—H in the same signal relay.

It is, therefore, easy to discriminate between faults on the measuring value transmitter and in the transmission line.

The principle of impulse transmission described may be used in conjunction with other methods of intensity measurement, for example the potentiometer method. The only condition is that the current for the intensity measurement even at the lowest measuring value, is not below that required to operate the relays FR and MR.

While a suitable embodiment of the invention has been described herein, it is to be understood that it is not intended as limitations except within the scope of the claims hereto or hereinafter appended.

I claim:

1. In a system for the simultaneous transmission of intensity measuring values and impulses by one single pair of wires from a sender station to a receiver station, an arrangement comprising means for transmitting through the said single pair of wires between said stations a direct current proportional to said measuring values, an intensity measuring value sender, an impulse transmitter having means for reversing the direction of the intensity measuring current, an impulse receiver, an intensity measuring instrument, and means for maintaining the original direction of said current within the intensity measuring instrument.

2. In a system for the simultaneous transmission of intensity measurement values and impulses by one single pair of wires from a sender station to a receiver station, an arrangement comprising means for transmitting through the said single pair of wires a direct current proportional to the said measuring values, an intensity measuring value sender, an impulse transmitter having means for reversing the direction of the intensity measuring current, an impulse receiver, an intensity measuring instrument, and a rectifier means for maintaining the original direction of said current within the intensity measuring instrument.

3. In a system for the simultaneous transmission of intensity measuring values and impulses by one single pair of wires from a sender station to a receiver station, an arrangement comprising means for transmitting through the said single pair of wires a direct current proportional to the said measuring values, an intensity measuring values sender, an impulse transmitter having means for reversing the direction of the intensity measuring current, an impulse receiver, an intensity measuring instrument, means for maintaining the original direction of said current within the intensity measuring instrument, and a condenser for maintaining the intensity measuring current through the receiver instrument during the reversal of its direction in the said wires.

4. In a system for the simultaneous transmission of intensity measuring values and impulses by one single pair of wires between a sender station and a receiver station by means of direct current proportional to said measuring values, an arrangement comprising an auxiliary means in the sender station providing a certain fundamental value greater than zero for the intensity measuring current even at its lowest measuring value.

5. An arrangement according to claim 4, comprising a separate voltage source adapted to be switched-in on the occurrence of faults in the intensity measuring value sender, the current of said source being equal to the fundamental current value of said sender.

6. An arrangement according to claim 4, comprising means for signalling faults in both the intensity measuring value sender and in the said transmission lines.

References Cited in the file of this patent
UNITED STATES PATENTS

| | | |
|---|---|---|
| 1,594,727 | Harrison | Aug. 3, 1926 |
| 1,822,203 | Collins | Sept. 8, 1931 |
| 2,114,578 | Strauss et al. | Apr. 19, 1938 |
| 2,452,023 | Wild | Oct. 19, 1948 |
| 2,550,109 | Derr | Apr. 24, 1951 |